United States Patent [19]

Nishimura et al.

[11] Patent Number: 4,587,409

[45] Date of Patent: May 6, 1986

[54] INFORMATION PROCESSING DEVICE

[75] Inventors: Kosuke Nishimura; Yoshiro Kataoka, both of Yamatokoriyama, Japan

[73] Assignee: Sharp Kabushiki Kaisha, Osaka, Japan

[21] Appl. No.: 555,184

[22] Filed: Nov. 25, 1983

[30] Foreign Application Priority Data

Nov. 30, 1982 [JP] Japan ................................. 57-211704
Nov. 30, 1982 [JP] Japan ................................. 57-211705
Mar. 23, 1983 [JP] Japan ................................. 58-49148

[51] Int. Cl.$^4$ ............................................... G06F 5/00
[52] U.S. Cl. .................................................... 235/380
[58] Field of Search ......................................... 235/380

[56] References Cited

U.S. PATENT DOCUMENTS 4,222,109 9/1980 Siwula ......................... 235/380 U X Primary Examiner—Harold I. Pitts
Attorney, Agent, or Firm—Birch, Stewart, Kolasch & Birch

[57] ABSTRACT

An electronic bookkeeping device is useful in association with use of credit cards for controlling use of various credit cards. The device stores data relative to the extent of use of each card, and assists a user in making the most effective use of a plurality of credit cards.

2 Claims, 25 Drawing Figures

Fig. 6

| n | N (CK.NO.) | M (AMOUNT) |
|---|---|---|
| 0 | N0 | M0 |
| 1 | N1 | M1 |
| 2 | N3 | M2 |
| 3 | N4 | M3 |
| ⋮ | ⋮ | ⋮ |
| 28 | N28 | M28 |
| 29 | N29 | M29 |

MA

| A | |
|---|---|
| B | |
| C | MB (for CARD) |
| D | |
| E | |
| O (OPENING BAL) | |
| P (CURRENT BAL) | MC (for CK BOOK) |
| Q (MINIMUM BAL) | |
| R (LAST CHECK NO) | |
| X | |
| Y | |
| Z | MD (for CALCULATOR) |
| W | |
| M | |
| n    d    b | ME |

INFORMATION PROCESSING DEVICE

BACKGROUND OF THE INVENTION

The present invention relates to an electronic book-keeping device utilizeable in association with credit cards for the individual control of the cumulative amounts of the respective credit card bills incurred by the use of the credit cards.

With the advent of the age of credit card, it is not rare for a single person to have a number of, for example, five, credit cards. The owner has to keep a written record concerning the amount paid for a purchase done by the use of each of the credit cards because the credit card bills come from different sources. If he or she fails to do so, it will often occur that the total amount of the credit card bills payable for the use of one credit card may exceed the credit line, or unequal use of the credit cards may result. In addition, unless the written records one for each credit card are checked against each other occasionally or from time to time, the owner of the credit cards will be unable to grasp easily the total amount of the credit card bills incurred by the use of all of the cerdit cards.

In view of the above, an electronic book-keeping device has been proposed wherein a charge storage means for the storage of the charge corresponding to each credit card and means for updating the contents stored in the charge storage means are provided to enable it to be used for the control of the cumulative amounts of the respective credit card bills. However, it has been found that, with this conventional book-keeping device, since the charge associated with each credit card can be merely ascertained by manipulating a key for the charge display, it requires a substantial time for the owner to select one of the credit cards which is most suited for actual use and, therefore, time-consuming and complicated handling procedures are required.

Because of the time-consuming and complicated handling procedures required in the conventional device, it has often, very often occurred that the owner goes through the use of the credit cards without ascertaining the cumulative amounts of the respective credit card bills, thereby creating the unequal use of all of the credit cards. In addition, since the cumulative amounts of the respective credit card bills can not readily be grasped, it is not easy to select one of the credit cards that is most suited in terms of the equal opportunity of use of all of the credit cards, at the time the payment must be done.

SUMMARY OF THE INVENTION

The present invention has been developed with a view to substantially eliminating the above described disadvantages and inconveniences and has for its object to provide an improved electronic book-keeping device with which the credit cards can be equally used.

Another object of the present invention is to provide an improved book-keeping device of the type referred to above, wherein one of the credit cards which appears to be most suited for actual use can be easily selected with no need to provide the device with any extra key for the purpose of selecting it.

The present invention also pertains to an information processing device (such as a personal asset control device (which may, or may not, be used concurrently for calculator and watch purpose) for checking the transaction of money occurring in a bank account as a result of checks being drawn or deposits being made) of a type wherein the inquiry done by the owner as to whether or not numerical values entered are correct can be responded to by depressing one of the "YES" and "NO" keys. Accordingly, it is a further object of the present invention to provide an information processing device of the type referred to above, wherein means for taking for "YES" the failure to depress any one of these keys within a predetermined time subsequent to the inquiry is employed, thereby simplifying the operating procedure thereof.

In one aspect of the present invention, the electronic book-keeping device comprises an input keyboard having a plurality of input keys for the entry of the amount of money to be paid for the purchase done by the use of each of the credit cards, a storage means for storing charges one for each credit card, and means for updating the charge associated with one of the cards used, each time the amount of money to be paid for the purchase done by the use of such one of the cards. In accordance with the present invention, the book-keeping device also comprises means for sequentially displaying the charges associated with the respective credit cards at the time of entry of the amount of the money in the order from the highest charge down to the smallest charge so that, in the case where the charge displayed is found not exceeding the credit line and the amount of the charge plus the amount of purchase is found appropriately balancing with the charges of the other credit cards, one of the credit cards which is associated with the charge displayed can be selected. In addition means is also provided for displaying, at the time of payment to be done, the charges sequentially from the largest one down to the smallest one so that, at the time the charge display which appears to render the charges to be balanced with each other upon the payment takes place, one of the credit cards associated with the displayed charge can be selected. The card selection to be done at the time of purchase and payment is performed by means of a card selecting means.

According to the present invention, when the purchase is to be done, the smallest charge of all is first displayed and, when the payment is to be done, the largest charge of all is first displayed. Therefore, the owner need not go through an operating procedure necessary to ascertain the charge for each card. In addition, all of the credit cards can equally be used.

In another aspect of the present invention, the electronic book-keeping device comprises an input keyboards having a plurality of input keys for the entry of the amount of money payable for the purchase done by the use of each of the credit cards, a display unit disposed adjacent the input keyboard for displaying input data and results of calculations, a storage means for storing charges one for each credit cards, and means for updating, each time the amount of the money is entered, the charge associated with one of the cards used. In accordance with the present invention, the display unit is provided with means for causing the display unit to display all of the symbols signifying the respective credit cards before one of the cards is selected, and there is also provided means for selecting one of the cards when one of the input keys which is located adjacent one of the symbols displayed representative of such one of the cards has been depressed. This is particularly advantageous in that, since the owner needs only to depress one of the input keys which is lined up with one of the symbols signifying the respective credit cards, a selector switch of slide contact type is not required, with the handling procedure consequently simplified.

BRIEF DESCRIPTION OF THE DRAWINGS

These and other objects and features of the present invention will become clear from the following description taken in conjunction with a preferred embodiment thereof with reference to the accompanying drawings, in which:

FIG. 6 is a schematic diagram showing a memory map for a random access memory used in the asset control device of the invention;

DETAILED DESCRIPTION OF THE EMBODIMENT

Figure 1:
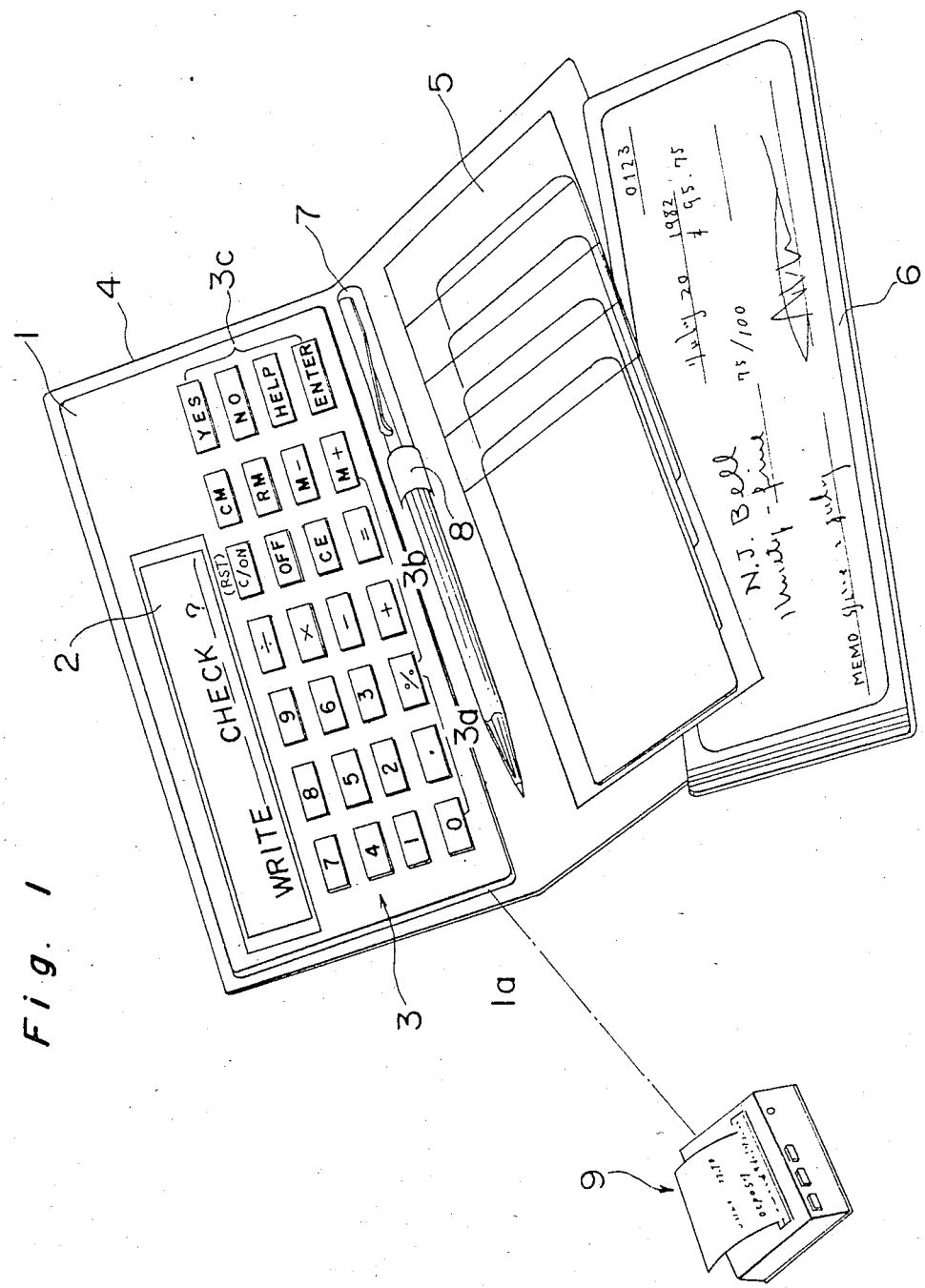
FIG. 1 is a perspective view of a personal asset control device according to the present invention.

Before the description of the present invention proceeds, it is to be noted that like parts are designated by like reference numerals throughout the accompanying drawings.

Referring first to FIG. 1, a personal asset control device according to the present invention comprises a generally rectangular plate-like body 1 having a dot-matrix liquid crystal display unit 2 and an input keyboard 3. The body 1 has at its one end a connecting terminal 1a for the electric connection with an external printer 9 which is one of the accessories optionally available to the device. This body 1 is accommodated in a holdable plate-like casing 4 which is provided with a card holder 5 for the accommodation or securement of a batch of personal checks 6 and a pen holder 8 for the support of a writing instrument, for example, a ball-point pen 7.

The input keyboard 3 includes numerical input keys 3a, function keys 3b signifying the four arithmetic functions and the reading and writing of information in a memory and function keys 3c for entering information of transactions. The function keys 3c include "YES" and "NO" keys adapted to be depressed when the information displayed has been confirmed correct and wrong, respectively, a "HELP" key adapted to be depressed when the user of the device is at a loss as to how to use the device, and an "ENTER" key adapted to be depressed when the information of transactions are to be entered.

Figure 2:
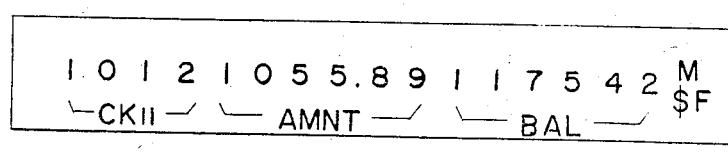
FIG. 2 is a plan view showing an example of display effected in a display unit of the asset control device.

Referring now to FIG. 2 showing one example of information displayed on the display unit 2, the first four digits shown as reading "1012" represents the serial number of a check; the next six digits shown as reading "1055.89" represent the amount of the check (in terms of dollar); and the last six digits shown as reading "1175.52" represent the amount of current balance.

Figure 3:
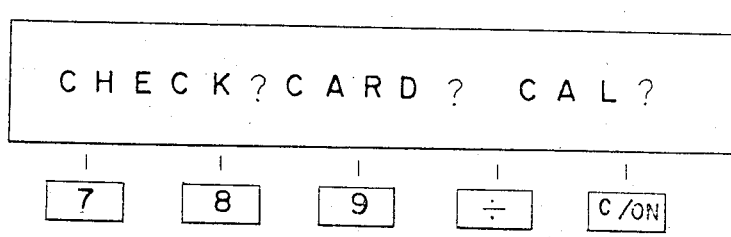
FIG. 3 is a view similar to FIG. 2, showing mode designations being displayed in the display unit which are shown together with some of the keys in the keyboard.
Figure 4:
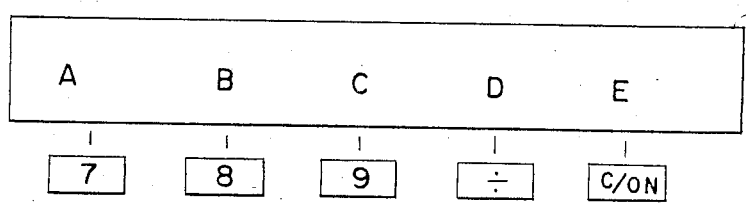
FIG. 4 is a view similar to FIG. 2, showing the symbols representative of five respective types of credit cards, which are shown together with some of the keys in the keyboard.

FIG. 3 illustrates the display effected when one of the operating modes of the device is to be selected. This display is effected simultaneously with the activation of the device with an electric power for the purpose of making inquiries to the user if he or she wish to use the device in a check mode, a credit card mode or a calculator mode. It is to be noted that the "7", "8", "9", "÷" and "C/ON" keys are arranged immediately below the display unit 2 so that, by depressing one of the "7", "9" and "C/ON" keys, one of the mode designations displayed which is generally aligned with such one of the keys can be selected. Specifically, when the "7" key is depressed, the device operates under the check mode; when the "9" key is depressed, the device operates under the credit card mode; and when the "C/ON" key is depressed, the device operates under the calculator mode. FIG. 4 illustrates the display effected when one of the five credit cards designated A, B, C, D and E cards, respectively, is to be selected. As shown, the "7", "8", "9", "÷" and "C/ON" keys are located immediately below, and aligned with, the displayed symbols "A", "B", "C", "D" and "E" signifying the A, B, C, D and E credit cards. Accordingly, when the "7", "8", "9", "÷" and "C/ON" keys are depressed one at a time, the A, B, C, D and E cards are selected, respectively.

Figure 5:
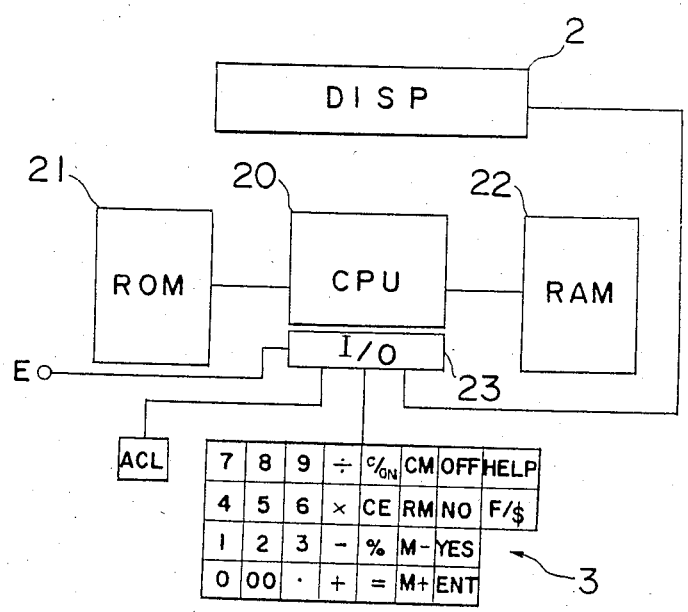
FIG. 5 is a schematic block circuit diagram of an asset control device according to the invention.

Referring now to FIG. 5, the personal asset control device according to the present invention comprises a central processing unit (CPU) 20 connected through respective bus lines with a read-only memory (ROM) 21 for the storage of programs and a random access memory 22 used to store information of transactions and the like and allocated with work areas and flags. Keyboard instructions outputted from the keyboard 3 are supplied to the CPU 20 through an input and output interface 23. Data to be displayed by the display unit 2 are supplied to the display unit 2 through the interface 23. Also connected with the interface 23 is an external terminal E and an auto-clear key ACL.

FIG. 6 illustrates a memory map of an essential part of the RAM 22.

An area MA constitutes a transaction storage means and is comprised of a group of 30 registers N0 to N29 each for the storage of the serial number of a check and also another group of 30 registers M0 to M29 each for the storage of the amount of such check.

An area MB is comprised of five memories associated respectively with the A to E cards for the storage of the cumulative amount of money paid by the use of the respective credit card.

An area MC is comprised of four registers O, P, Q and R. The register O is used to store the opening balance; the register P is used to store the current balance; the register Q is used to store the minimum deposited fund or minimum balance; and the register R is used to store the serial number of the last check drawn.

An area MD is comprised of four operational registers X, Y, Z and W and a memory M for the storage of calculated data.

An area ME is comprised of counters n, d and b. The counter n is used to specify the address of the 30 registers in the area MA, and the counters d and b are used when a RECONCILE mode (a transaction check routine), as will be described later is to be executed.

The operation of the asset control device of the construction described above will now be described with reference to the various flow charts shown in FIG. 7 through FIG. 17.

Figure 7:
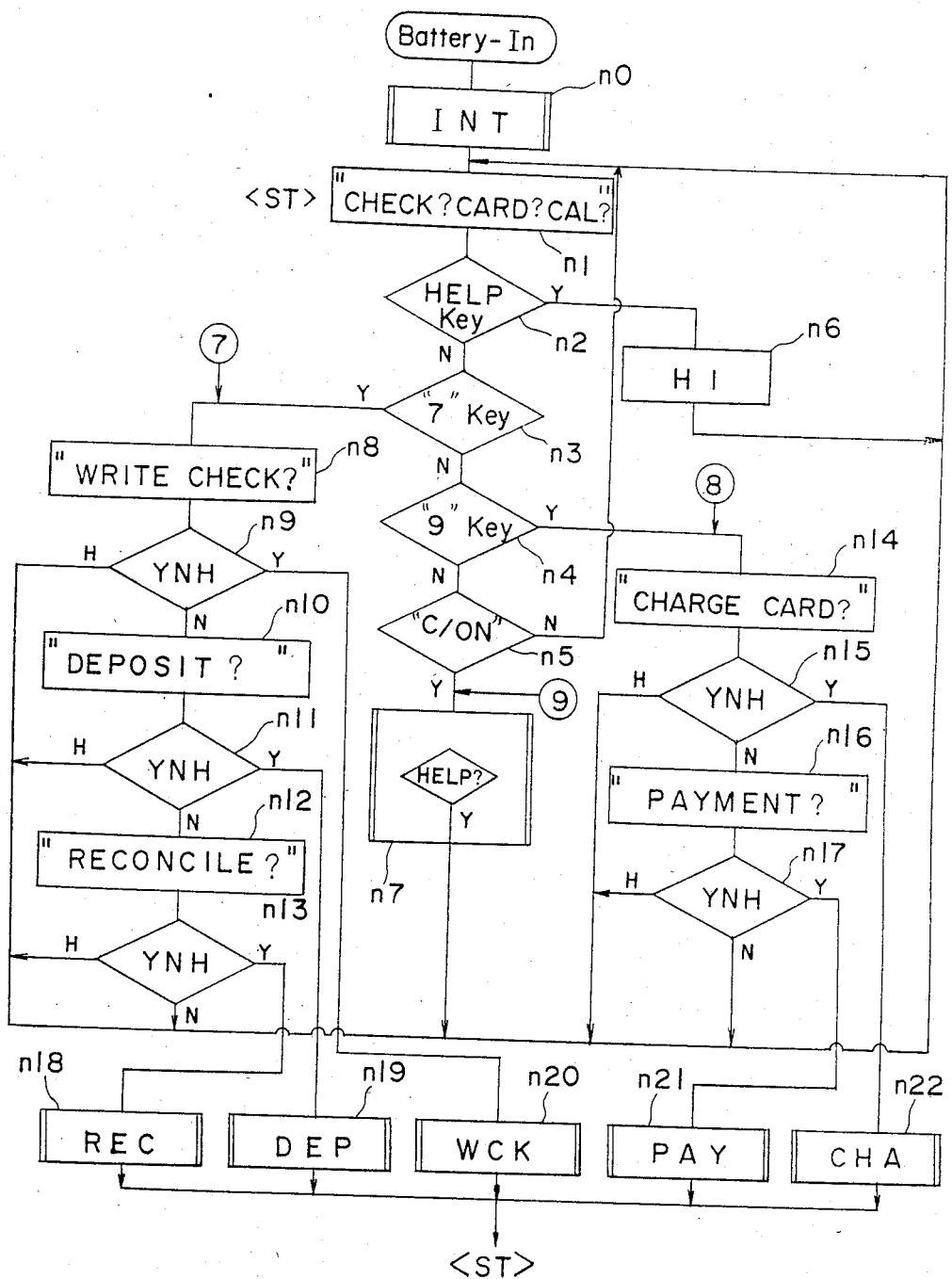
FIG. 7 is a flow chart showing a main control program of sequential operation of the device.
Figure 8:
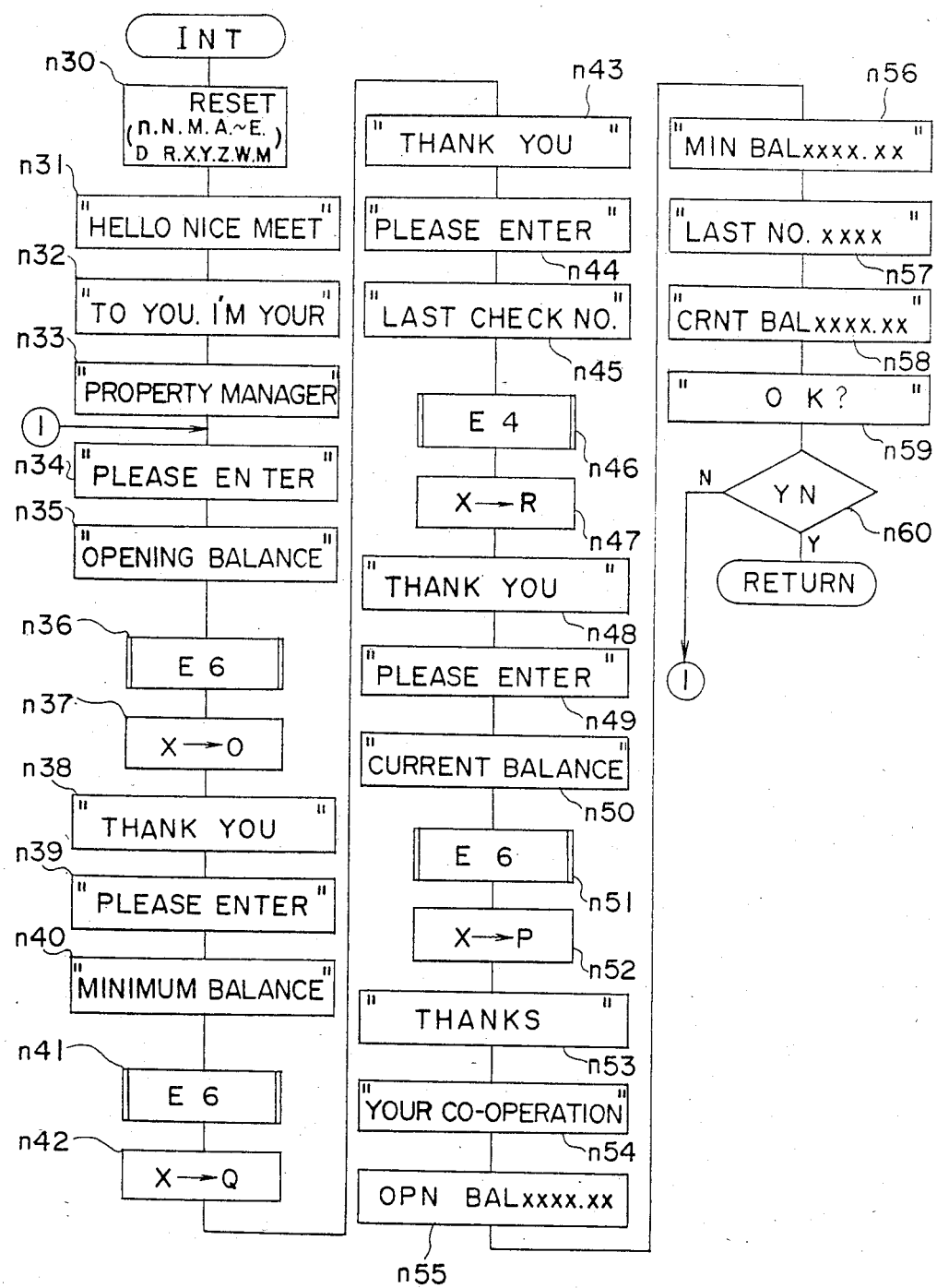
FIG. 8 is a flow chart showing an initialization subroutine.

Referring to FIG. 7 which illustrates a main routine, when a battery is inserted, an initialization subroutine shown in FIG. 8 is executed at a step n0. During the execution of the initialization subroutine, the opening balance, the current balance, the minimum balance and the serial number of the last check drawn are all stored in the area MC of the RAM 22.

Figure 9:
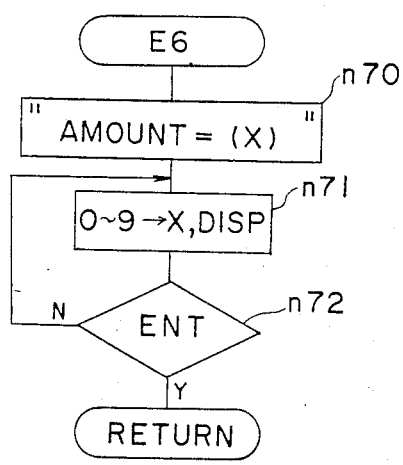
FIG. 9 is a flow chart showing a subroutine E6 of FIG. 8.

Referring to FIG. 8, at the step n30, the memory resetting takes place. The areas to be reset are all of the areas shown in FIG. 6. Then, at the next successive steps n31 to n33, a greeting "Hello nice meet to you. I'm your property manager." is displayed in the display unit 2 in three fractions "HELLO NICE MEET", "TO YOU. I'M YOUR" and "PROPERTY MANAGER" which appear one after another at intervals of 0.5 to a few seconds. Subsequent to the display of the greeting and at the successive steps n34 and n35, an instruction to the user reading "Please enter the opening balance." is displayed in two fractions "PLEASE ENTER" and "OPENING BALANCE" to invite the user to enter the opening balance in terms of the balance of the deposit at the bank as of the end of the previous month. A subroutine E6 to be executed at the step n36 is for causing the amount of money entered through the input keyboard to be stored in the register X and is shown in FIG. 9. As shown in FIG. 9, at the step n70, a legend "AMOUNT=(X)" is displayed to invite the user to enter the amount of money by manipulating source of the numerical input keys. The data of the amount of money so entered at the step n70 is stored in the register X and, at the same time, displayed by the display unit 2 at the step n71. Specifically, the data of the amount of money entered before the "ENTER" key is depressed is stored in the register X, but when the "ENTER" key is depressed, the program flow returns to the step n37 shown in FIG. 8.

It is to be noted that, since the entry of the opening balance is waited for at the step n35 in the program flow of FIG. 8, the opening balance is stored in the register X at the time the subroutine E6 has been executed at the step n36. At the step n37, the contents of the register X are transferred to the register O for the registration of the opening balance. At the subsequent successive steps n38 to n40, a message reading "Thank you. Please enter the minimum balance" is displayed in three successive fractions "THANK YOU", "PLEASE ENTER" and "MINIMUM BALANCE" to invite the user to enter the minimum deposited fund or minimum balance. The minimum balance is then stored in the register X through the execution of the subroutine E6 at the step n41. After the execution of the subroutine E6 and at the step n42, the minimum balance stored in the register X is transferred to the register Q. Then, at the successive steps n43, n44 and n45, a message is displayed in three successive fractions "THANK YOU", "PLEASE ENTER" and "LAST CHECK NO." to invite the user to enter the serial number of the last check drawn. At the subsequent step n46, the last check number is stored in the register X and is at the step n47 transferred to the register R. After the completion of the transfer, and at the three successive steps n48 to n50, a message is displayed in three successive fractions "THANK YOU", "PLEASE ENTER" and "CURRENT BALANCE" to invite the user to enter the current balance. When and after the contents thereof have been entered at the step n51, the current balance so entered is transferred to the register P at the step n52. When the opening balance, the minimum balance, the last check number and the current balance have been stored in the registers O, Q, R and P, respectively, a message reading "Thanks. Your cooperation" is displayed at the two successive steps n53 and n54 in two fractions "THANKS" and "YOUR CO-OPERATION". Thereafter, at the successive steps n55 to n59, the opening balance, the minimum balance, the last check number, the current balance, and a question reading "OK?" signifying whether or not each of the contents stored respectively in the registers O, Q, R and P is correct and are successively displayed. If all of these data are found to have been correctly stored, the user has to depress the "YES" key at the step n60 thereby causing the program flow to return to the main routine. On the other hand, if one or some of the data are found to have been incorrectly stored, he or she has to depress the "NO" key at the step n60 causing the program flow to proceed to the step n34 so that the user can re-enter the required information.

Referring back to FIG. 7 showing the main routine, after the execution of the initialization routine at the step n0. "CHECK? CARD? CAL?" display is effected. The condition in which the display unit 2 displays the legends "CHECK? CARD? CAL?" is hereinafter referred to as an ST condition. This ST condition signifies that the user should select one of the operating modes of the asset control device. The selection of one of the operating modes can be done by depressing one of the "7", "9" and "C/ON" keys. The steps n3 to n5 are decision steps at which inquiries are made one after another to find one of the "7", "9" and "C/ON" keys which has been depressed in selecting the operating mode. It is to be noted that, when the "HELP" key is depressed during the ST condition, at the step n2, the process proceeds to the step n6 at which a subroutine HI shown in FIG. 10 is executed.

Figure 10:
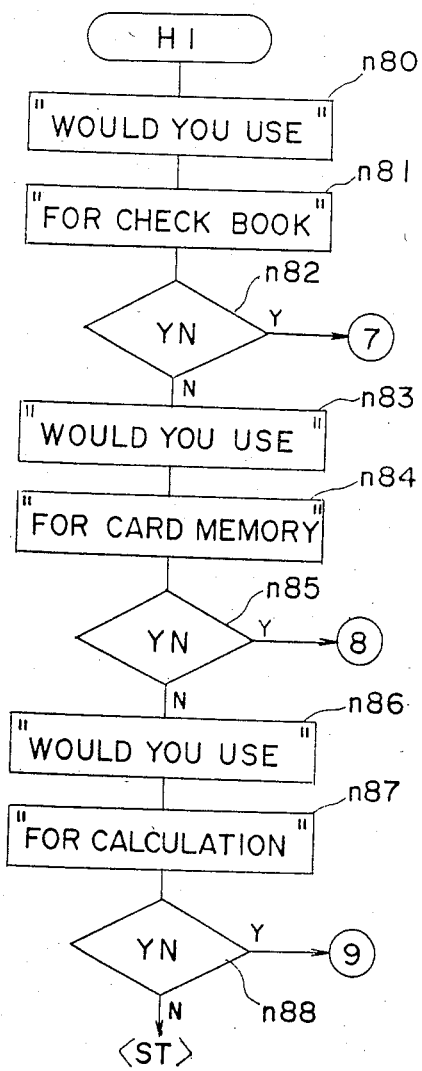
FIG. 10 is a flow chart showing a subroutine HI.

Referring to FIG. 10 showing the subroutine HI to be executed at the step n6 of the main routine, a first inquiry is made with the display unit 2 displaying "WOULD YOU USE FOR CHECK BOOK" in two fractions at the two successive steps n80 and n81. This is a question asking the user if he or she intends to use the asset control device in the check mode. If the "YES" key is depressed at the subsequent step n82, the program flow proceeds to the step n8 of the main routine. On the other hand, if the "NO" key is depressed at the step n82, then the next inquiry is made with the display unit 2 displaying "WOULD YOU USE FOR CARD MEMORY" in two fractions at the successive steps n83 and n84 as shown. This is a question asking the user if he or she intends to use the device in the credit card mode. If the "YES" key is depressed at the step n85, the program flow proceeds to the step n14 of the main routine, but if the "NO" key is depressed, the final inquiry is made with the display unit 2 displaying "WOULD YOU USE FOR CALCULATION" in two fractions at the successive steps n86 and n87 as shown, asking the user if he or she intends to use the device as a calculator. If the "YES" key is depressed at the step n88, the program flow proceeds to the step n7 of the main routine, but if the "NO" key is depressed, the program flow return to the step n1 of the main routine.

The subroutine HI is provided for facilitating the selection of one of the operating modes by allowing the device to communicate with the user. Accordingly, should the user be unfamiliar in handling the device, he or she has to make use of the "HELP" key to conduct the communication with the device in determining one of the operating modes.

Referring to the main routine shown in FIG. 7, if the "7" key is depressed at the step n3 during the ST condition, the check mode is selected and the program flow proceeds to the step n8. At the step n8, "WRITE CHECK?" is displayed asking the user if he or she intends to draw a check. If the user intends to do so, the program flow proceeds to the step n20 at which a subroutine WCK is executed. If the user does not intend to do so, the program flow proceeds to the step n10 at which "DEPOSIT?" is displayed asking the user if he or she intends to deposit money. When the "YES" key is depressed at the step n11, the program flow proceeds to the step n19 at which a subroutine DEP is executed, but when the "NO" key is depressed, the program flow proceeds to the step n12 at which "RECONCILE?" is displayed asking the user if he or she wishes to make a check of the transactions of money. If the "YES" key is depressed at the step n13, a subroutine REC is executed at the step n18, but if the "NO" key is depressed, the program flow returns to the step n1. It is to be noted that when the "HELP" key is depressed at any one of the steps n9, n11 and n13, the program flow returns to the step n1.

Should the "9" key be depressed at the step n4 during the ST condition, the program flow proceeds to the step n14. As hereinbefore described, the depression of the "9" key means the selection of the credit card mode. At the step n14, "CHARGE CARD?" is displayed asking the user if he or she intends to make a purchase with a credit card. If the "YES" Key is depressed at the step n15, the program flow proceeds to the step n22 at which a subroutine CHA is executed. On the other hand, if the "NO" key is depressed at the step n15, then, "PAYMENT?" is displayed at the step n16 asking the user if he or she intends to effect payment against the credit card bill. If the "YES" key is depressed at the step n17, a subroutine PAY is executed at the step n21, but if the "NO" key is depressed, the program flow returns to the step n1. It is to be noted that when the "HELP" key is depressed at any one of the steps n15 and n17, the program flow returns to the step n1.

Should the "C/ON" key be depressed at the step n5, the calculator mode is selected and a subroutine for the calculation is executed at the step n7. The subroutine for the calculation is well known to those skilled in the art. However, if the "HELP" key is depressed during the execution of the calculator subroutine, the calculator subroutine is interrupted and the program flow proceeds to the step n1.

In the manner as hereinabove described, one of the check, credit card and calculator modes can be selected and the subroutine corresponding to the selected mode can be executed. Each of the subroutines REC, DEP, WCK, PAY and CHA will now be described.

Figures 11A, 11B:
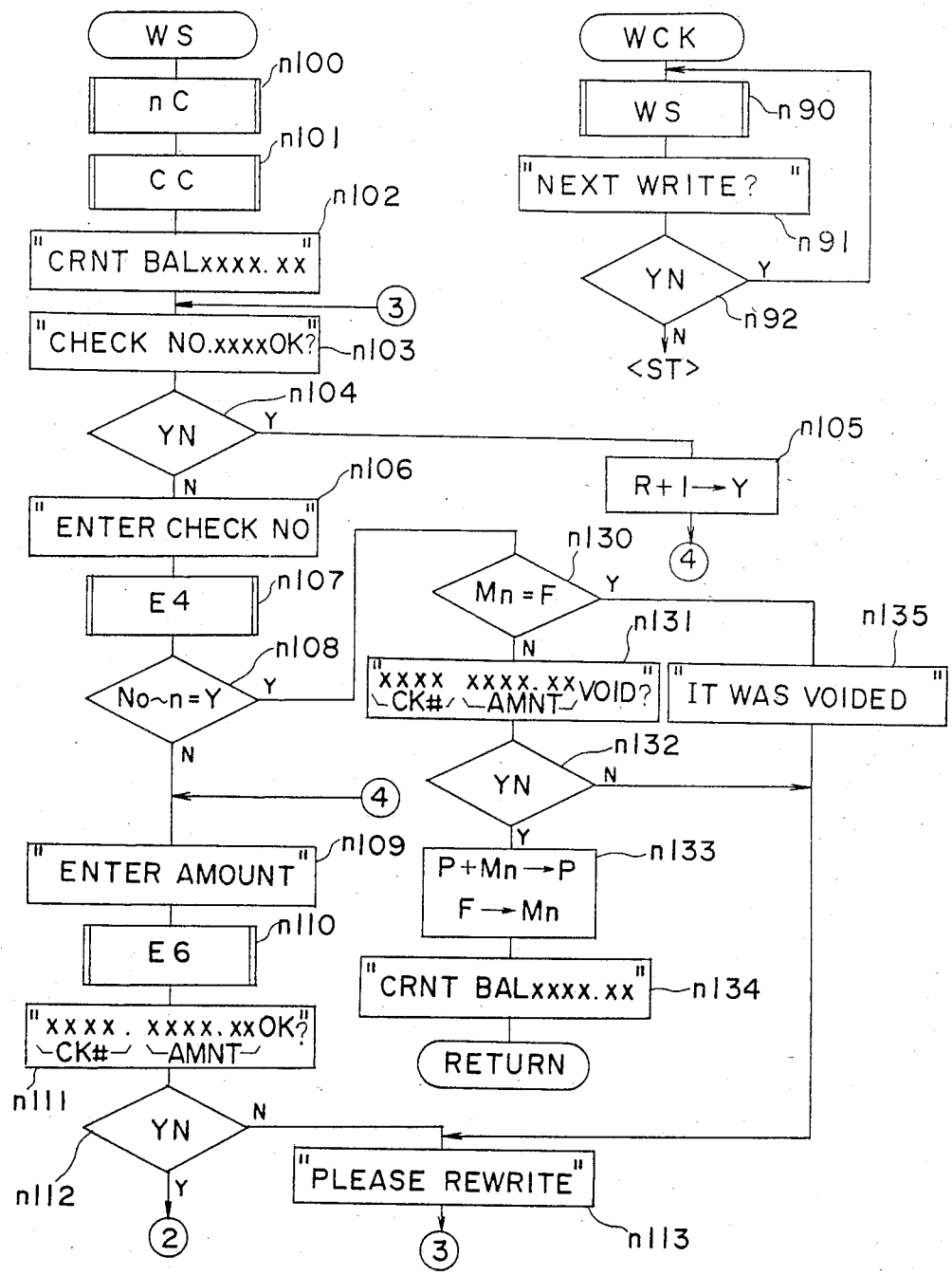
FIG. 11(A) is a flow chart showing a subroutine WCK.
FIGS. 11(B) and 11(C) are flow charts showing a "write check" processing subroutine.
Figure 11C:
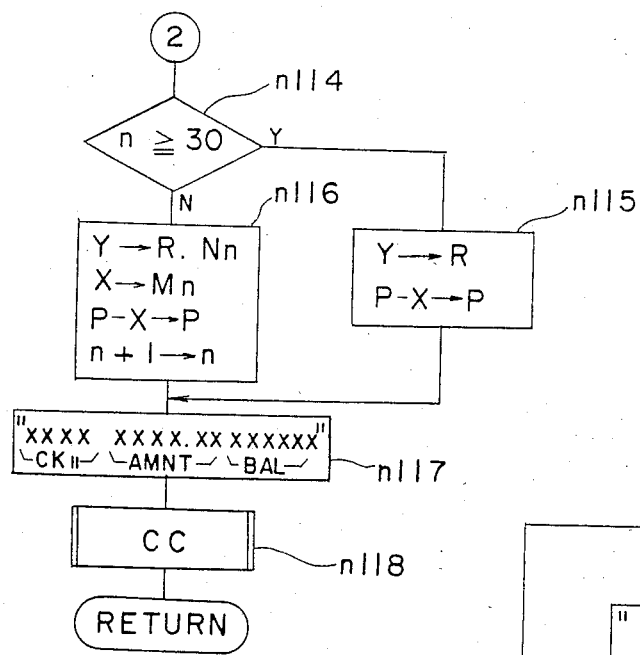

Referring first to FIG. 11(A) showing the subroutine WCK to be executed at the step n20 of the main routine, at the step n90, a write-check processing subroutine WS shown in FIG. 11(B) for the drawing of a check under the check mode is executed. Subsequent to the execution of the subroutine at the step n90, "NEXT WRITE?" is displayed at the step n91 asking the user if he or she intends to draw the next succeeding check. If the "YES" key is depressed at the step n92, the program flow proceeds to the step n90, but if the "NO" key is depressed, the ST condition is resumed.

Referring to the subroutine WS shown in FIG. 11(B), and at the step n100, the lowermost subroutine nC is executed. During the execution of this subroutine nC, a decision is made as to whether or not all of the area MA of the RAM 22, that is, all of the N and M registers for the respective storage of the check numbers and the amounts of these checks, are totally used. After this decision, another subroutine CC is executed at the step n101. During the execution of the subroutine CC, a decision is made as to whether or not the current balance has broken the minimum balance. The details of each of the subroutines nC and CC will be described later.

Subsequent to the decision done at the step n101, the content of the register P representative of the current balance is displayed at the step n102. At this stage, the user can ascertain whether or not the amount of the check he or she is going to draw is smaller than the current balance, and also whether or not the balance less the amount of the check is in excess of the minimum balance. At the step n103, the checks are assumed to be drawn successively one after another and the last check number stored in the register R and incremented by one is displayed. If the user has confirmed the check number so displayed and when he or she depresses the "YES" key at the step n104, the program flow proceeds to the step n105 at which the check number stored in the register R and incremented by one is stored in the register Y for the calculator which uses it as a work area. On the other hand, if the "NO" key is depressed at the step n104, "ENTER CHECK NO." is displayed to invite the user to enter the correct check number. Subsequent to the step n106, the subroutine E4 is executed at the step n107.

Figure 12:
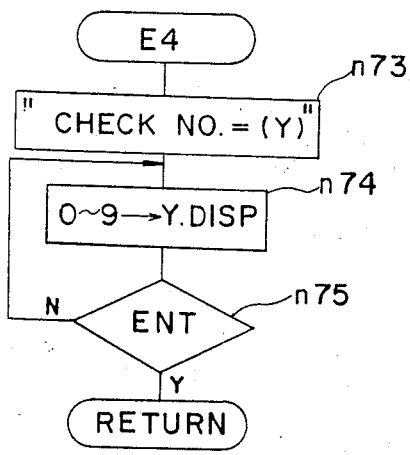
FIG. 12 is a flow chart showing a subroutine E4 of FIG. 8.

Referring to the subroutine E4 shown in FIG. 12, at the step n73, "CHECK NO.=(Y)" is displayed to invite the user to enter the check number. Then, as is the case with the subroutine shown in and described with reference to FIG. 9, the data entered are stored in the register Y at the step n74. When the "ENTER" key is subsequently depressed at the step n75, the program flow returns to the initial program flow.

After the execution of the subroutine E4 at the step n107, the correct check number has been stored in the register Y. However, at the step n108, a decision is made as to whether the check number stored in the register Y has been registered in the area MA of the RAM 22. If it has not been registered, the step n109 is carried out to display "ENTER AMOUNT" inviting the user to enter the amount of the check. Thereafter, the subroutine E6 is executed at the step n110 to store the amount of the check in the register X. Both the check number stored in the register X and the amount of the check stored in the register Y are then displayed at the step n111 for the purpose of reconfirmation to be done by the user. If the "YES" key is depressed at the subsequent step n112, the program flow proceeds to the step n114 shown in FIG. 11(C) at which a decision is made as to whether or not the area MA of the RAM 22 has become full. If the area MA is found full, the step n115 is carried out to transfer the content of the register Y to the register R as the last check number. At the same time, the amount stored in the register X is subtracted from the current balance stored in the register P, the balance being then stored in the register P. On the other hand, if the area MA is found not full, a process similar to that at the step n115 is performed and, at the same time, the content of the register Y and the content of the register X are registered in the register Nn in the area MA and the register Mn in the area MA, respectively. In addition, the count of the counter n is incremented by one. At the subsequent step n117, all of the check number, the amount of the check and the current balance are displayed. Then, the program flow proceeds to the step n118 at which, as is the case with the step n101, the current balance and the minimum balance are compared with each other.

On the other hand, in the event that the "NO" key is depressed at the step n112, "PLEASE REWRITE" is displayed at the step n113 and, thereafter, the program flow proceeds back to the step n103.

Figure 11E:
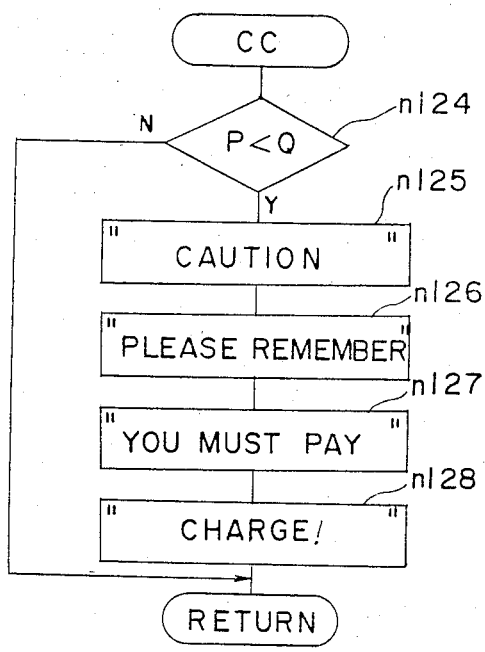
FIG. 11(E) is a flow chart of subroutine CC to be executed at step n101.
Figure 11D:
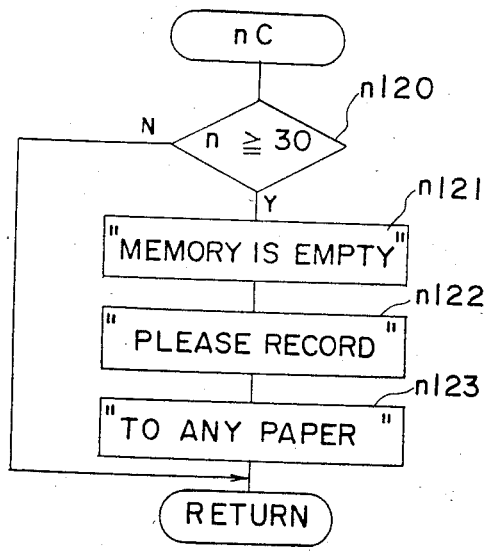
FIG. 11(D) is a flow chart of subroutine nC to be executed at step n100.

Referring to FIG. 11(D) showing the subroutine nC to be executed at the step n100, the counter n serves to specify the addresses of the registers N and M. Since the number of each of the registers N and M is 30, all of the registers are deemed full and are not ready to register information when the count of the counter n shows 30. Accordingly, if the count of the counter n is found to be exceeding 30 at the step n120, "Memory is empty. Please record to any paper." is displayed at the successive steps n121 to n 123 in three fractions "MEMORY IS EMPTY", "PLEASE RECORD" and "TO ANY PAPER" to inform the user that the intended registration cannot be performed. However, if the count is found to be smaller than 30, the program flow returns to the flow shown in FIG. 11(B).

The subroutine CC to be executed at the step n101 and shown in FIG. 11(E) is provided for calling the user's attention to the fact that the result of comparison of the minimum balance stored in the register Q and the current balance stored in the register P shows that the current balance has broken the minimum balance. Referring to FIG. 11(E) and at the step n124, the contents of the registers P and Q are compared with each other. If the current balance is greater than the minimum balance, the program flow shown in FIG. 11(B) is resumed. However, if the current balance is smaller than the minimum balance, a warning is effected at the four successive steps n125 to n128 in four fractions "CAUTION", "PLEASE REMEMBER", "YOU MUST PAY" and "CHARGE!" to inform the user of the possibility that, because of the current balance getting smaller than the minimum balance, he or she would be required to pay a requisite commission to the banker. Thus, where the user desires to avoid the payment of the commission, he or she should deposit money at the bank or cancel the check then drawn at the time the warning is so effected.

The cancellation of the check can be entered by the use of the subroutine WS. Specifically, the number of the check desired to be cancelled is entered at the step n107. Then, the program flow skips from the step n108 to the step n130. Since the content of the selected register M is not a code F, the step n131 is executed to display the check number desired to be cancelled and the amount of the check desired to be cancelled together with "VOID?" asking the user if he or she wishes to void the check and its amount displayed at the step n131. If the "YES" key is depressed at the step n132, a cancellation code F is stored in the register Mn and the amount stored in the register Mn is added to the current balance at the step n133 and, then, the current balance added with the amount of the check cancelled is displayed at the step n134, the program flow being thereafter returning to the main routine. In this way, the check once drawn can be cancelled and the information associated therewith is also cancelled from the memory in the device. However, since the check once cancelled may be registered as if having not been cancelled when the above described procedures are performed, the step n130 skips to the step n135 when the number of the cancelled check is entered. At the step n135, "IT WAS VOIDED" is displayed to inform the user that the check specified by such number had been cancelled and, then, at the step n113, "PLEASE REWRITE" is displayed to invite the user to re-enter the number of the check not cancelled.

As hereinbefore described, when a check is drawn and when the check once drawn is to be cancelled, the registration thereof takes place in the area MA. In addition, each time a check is drawn, a decision is carried out to determine whether or not the area MA is full, and if it is found to be full, the display takes place to that effect. Moreover, a decision is also carried out to determine whether or not the current balance has broken the minimum balance, and if it is found to have broken the minimum balance, the display to that effect takes place to call the user's attention.

Figure 13:
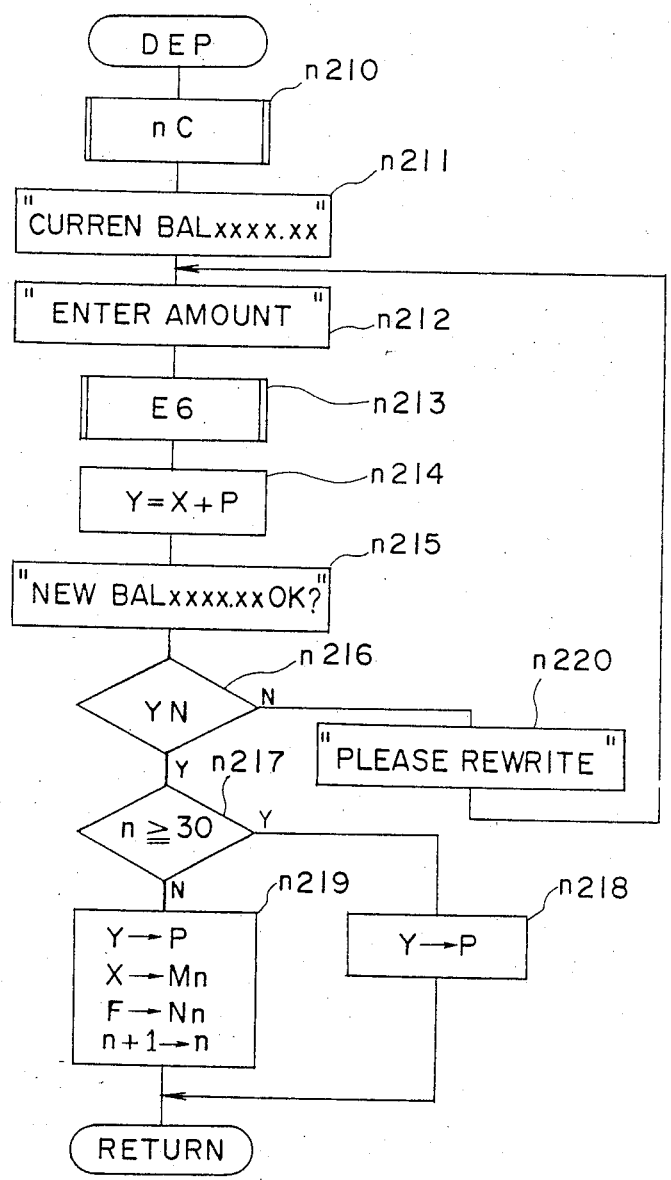
FIG. 13 is a flow chart showing a subroutine DEP.

Referring now to FIG. 13, the subroutine DEP is executed at the step n19 when the "YES" key has been depressed at the step n11. At the outset and at the step n210, the lowermost subroutine nC shown in and described with reference to FIG. 11(D) is executed to determine the status of the area MA and to effect the display, if all of the 30 registers have been utilized, to call the user's attention. After the execution of the subroutine nC, the current balance is displayed at the step n211. Then, at the step n212, "ENTER AMOUNT" is displayed, and the amount of money deposited which has been entered is stored in the register X. The data so stored is added to the current balance stored in the register P, the sum being then stored in the register Y (see the step n213). Thereafter, the new balance, that is, the sum of the deposited amount and the current balance, is displayed at the step n215 together with "OK?" asking the user's reconfirmation. If the "YES" key is depressed at the step n216, a decision is made at the step n217 as to whether or not the number of the registers used has exceeded 30 and, if it has exceeded, the program flow returns to the main routine after the content of the register Y has been transferred to and stored in the register P at the step n218. On the other hand, if the result of the decision at the step n217 is that it has not exceeded 30, the step n219 is performed to transfer the content of the register Y to the register P, to register the content of the register X in the register Mn and to register a deposit code F in the register Nn and also to increment the count of the counter n by one. However, if the "NO" key is depressed at the step n216, "PLEASE REWRITE" is displayed at the step n220 to invite the user to re-enter the amount of money deposited. In this way, the device operates under the check mode to perform the procedures resulting from the deposit of money.

Figure 14:
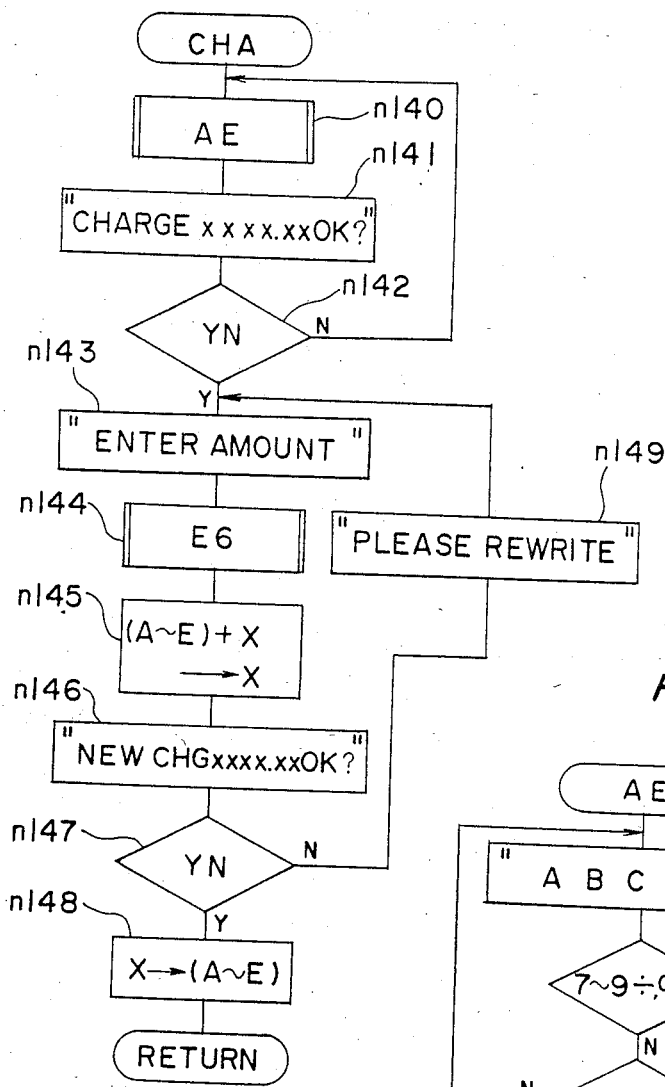
FIG. 14 is a flow chart showing a subroutine CHA.

The subroutine CHA performed at the step n22 of the main routine of FIG. 7 is executed when a purchase is done with a credit card. Referring particularly to FIG. 14, at the step n140, the lowermost subroutine AE is executed. During the execution of the subroutine AE, one of the five credit cards, i.e., one of the A, B, C, D and E cards, is selected. Referring to the subroutine AE shown in FIG. 5, at the step n150, the display as shown in FIG. 4 is effected. As hereinbefore described, the selection of one of the credit cards can be carried out by depressing one of the "7", "8", "9", "÷" and "C/ON" keys. Thus, when one of these keys is depressed at the step n151, the credit card specified by one of the displayed characters "A", "B", "C", "D" and "E" which is immediately above and aligned with one of the keys actually depressed is selected at the step n152. Should the "HELP" key be depressed at the step n153 without any of the keys depressed at the step n151, a message reading "I have five memories. Please assign each card to A to E." is displayed at the successive steps n154 to n156 in three fractions "I HAVE 5 MEMORIES", PLEASE ASSIGN" and "EACH CARD TO A-E" as shown to invite the user to depress one of the "7", "8", "9", "÷" and "C/ON" keys.

Referring to FIG. 14, subsequent to the execution of the subroutine AE at the step n140, the amount charged against the use of the selected card is displayed at the step n141 together with "OK?" asking for the user's reconfirmation. If the "YES" key is depressed at the step n142, the user is invited to enter the purchase cost and, at the step n144, the purchase cost stored in the register X is added to the charge, the resultant sum being then stored in the register X at the step n145. Subsequently, a new charge is displayed at the step n146 together with "OK?" asking for the user's reconfirmation. Should the "YES" key be depressed at the step n147, the new charge is stored as the cumulative amount for the card used and the program flow returns to the main route. On the other hand, if the "NO" key is depressed at the step n147, "PLEASE REWRITE" is displayed at the step n149, followed by the step n143. In this way, the subroutine CHA is executed.

Figures 18, 19:
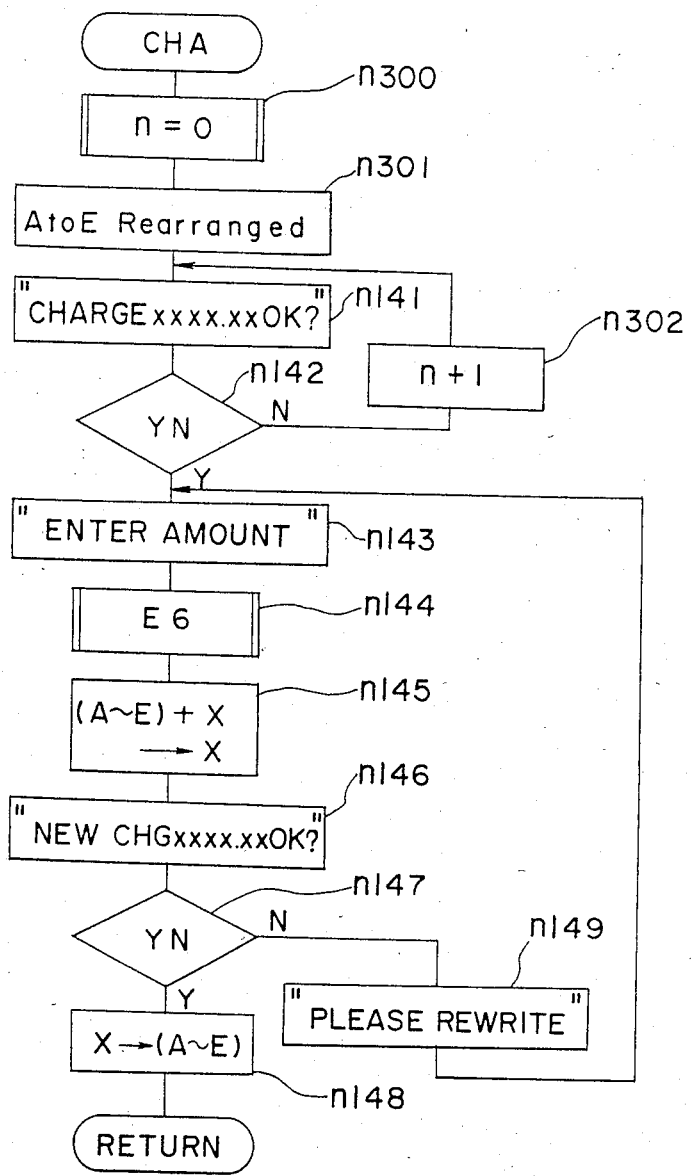
FIG. 18 illustrates a modification of the subroutine CHA of FIG. 14.
FIG. 19 is a schematic diagram showing the setting of a register.

It is to be noted that the program for the subroutine CHA may be modified as shown in FIG. 18. Referring to FIG. 18, the counter n is zeroed at the step n300. Subsequently, and at the step n301, the registers A to Z in the area MB are compared with each other so as to arrange them in the order of the amount of charges and the result of the comparison is stored in the register W. In this case, the addresses in the registers A to Z are designated by codes (10) to (14) which are stored in the register W. FIG. 19 illustrates the setting of the register W established after the execution of the step n301. Subsequent to the step n301, the charge stored in one of the registers A to Z which is specified by the counter n is displayed at the step n141 together with "OK?" asking for the user's reconfirmation. In the event that the "YES" key is depressed at the step n142, the program flow proceeds in the manner as hereinbefore described with reference to FIG. 14. However, in the event of the depression of the "NO" key at the step n142, the step n142 is followed by the step n302 at which the counter n is incremented by one so that the register (one of the registers A to Z) storing the next largest charge can be specified. The next largest charge is then displayed at the step n141 in the manner as described previously. As hereinbefore described, the charges associated with the five cards are sequentially displayed in the order from the largest amount down to the smallest, and when the user depresses the "YES" key when the proper charge has been displayed, the card corresponding to the displayed charge can be selected.

Where the subroutine PAY is selected during the execution of the main routine, it is executed in the manner which will now be described with reference to FIG. 16.

Figure 15:
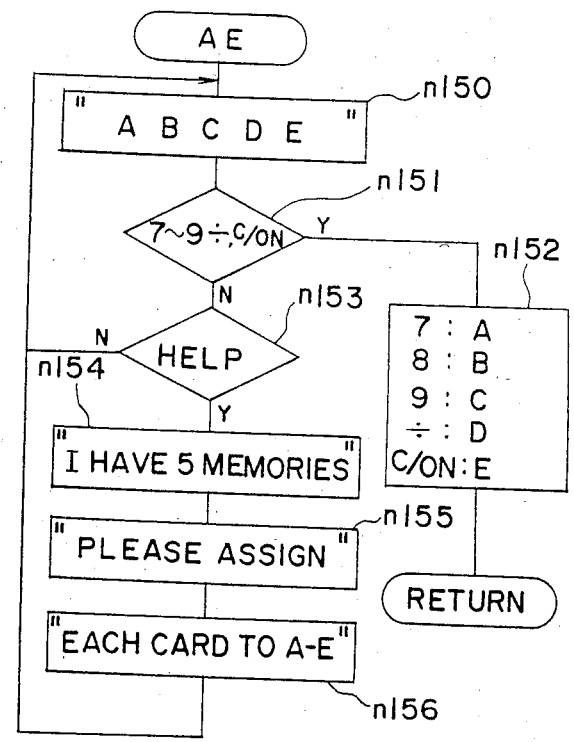
FIG. 15 is a flow chart showing a subroutine AE.
Figures 16, 17B:
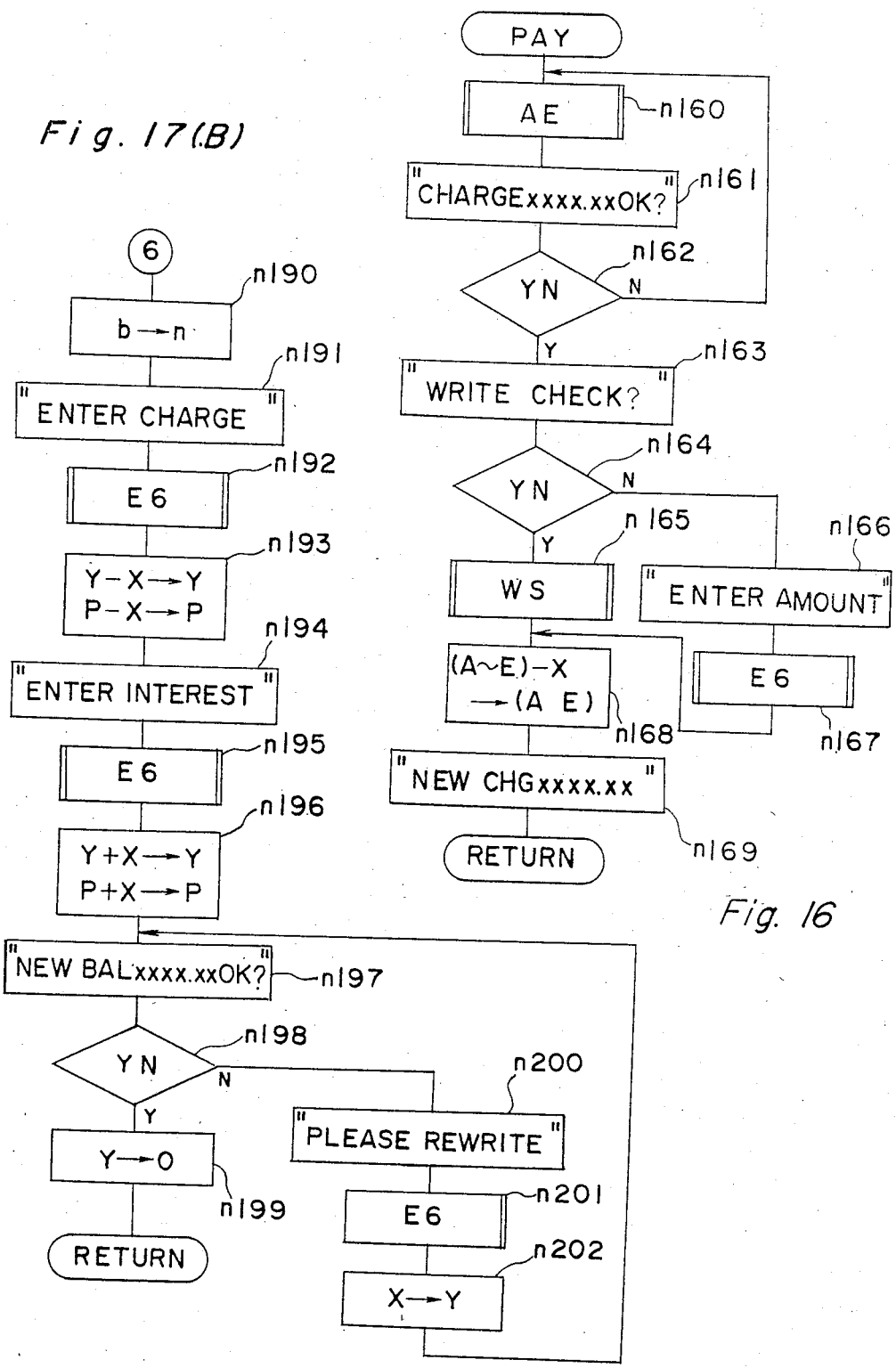
FIG. 16 is a flow chart showing a subroutine PAY associated with the payment using a card.
FIGS. 17(A) and 17(B) are flow charts showing a subroutine REC.

Referring now to FIG. 16, at the step n160, the subroutine AE is executed in the manner as hereinbefore described with reference to FIG. 15 and, as a result thereof, one of the cards is arbitrarily selected. The cumulative amount thereof is then displayed at the step n161 together with "OK?" asking for the user's reconfirmation. If the "YES" key is depressed at the step n162, "WRITE CHECK?" is displayed at the step n163, asking the user if he or she is going to settle the payment with a check. If the "YES" key is then depressed at the step n164, the subroutine WS is executed at the step n165 in the manner as hereinbefore described. On the contrary thereto, if the user intends to settle the payment with cash, the step n166 is performed at which time "ENTER AMOUNT" is displayed to invite the user to enter the amount to be paid with cash. Thereafter, the subroutine E6 is executed at the step n167 with the amount due consequently stored in the register X. Since the register X stores the amount due at the time either the step n165 or the step 167 is executed, the amount due is subtracted from the cumulative amount for the selected card with the balance being again stored. Then, a new charge is displayed at the step n169, followed by the return to the main routine.

Figure 20:
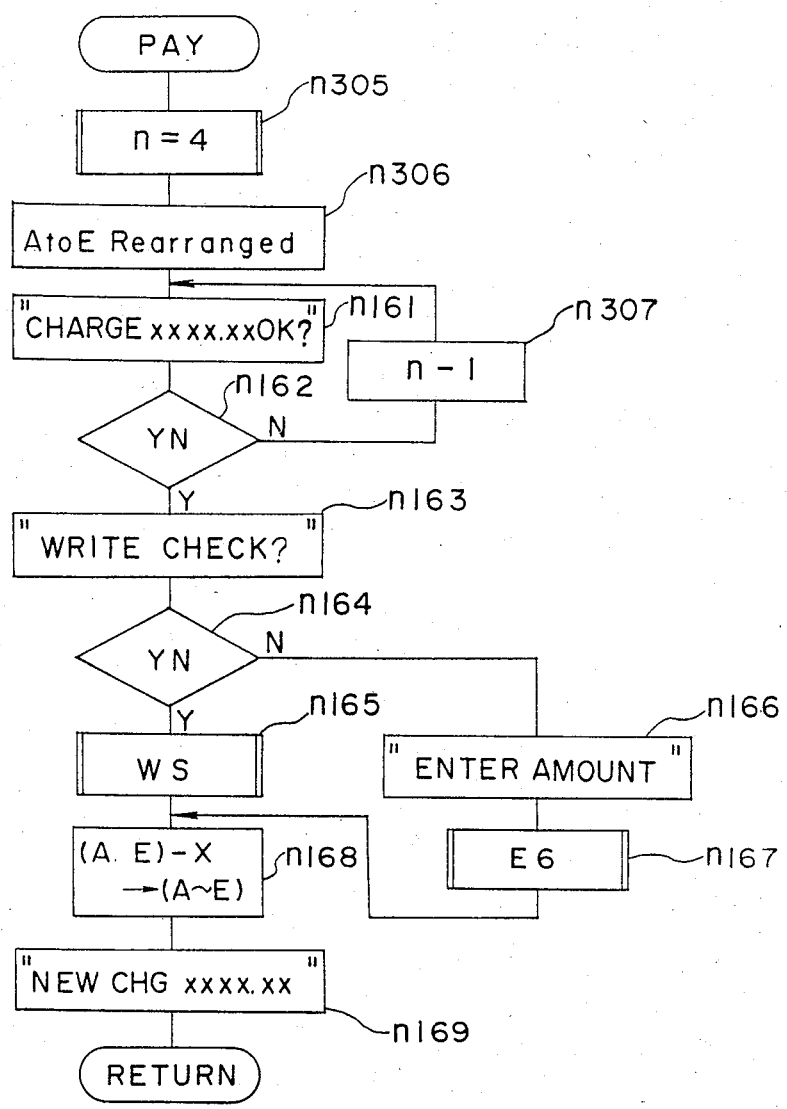
FIG. 20 illustrates a modification of the subroutine PAY of FIG. 16.

The subroutine PAY described with reference to FIG. 16 may be modified as shown in FIG. 20. Referring to FIG. 20, the counter n is set to 4 at the initial step n305, followed by the step n306 at which the registers A to Z are rearranged in a manner similar to that performed at the step n301 of the subroutine CHA of FIG. 18. The step n306 is then followed by the step n161 at which the charge stored in one of the registers A to E which is designated by the counter n is displayed together with "OK?" asking the user if he or she is going to use one of the cards which corresponds to the displayed charge. If he or she is not, he or she may depress the "NO" key at the step n162 and, in such case, the step n162 is followed by the step n307 at which the counter n is subtracted by one, followed by the step n161. The charges are sequentially displayed in the order from the largest amount down to the smallest through the repetition of the process including the steps n305 to n307. However, the user may depress the "YES" key at the step n162 when the proper charge has been displayed at the step n161. In this case, the step n162 is followed by the steps n163 to n169 in the manner as hereinbefore described with reference to FIG. 16.

The operation of the device which takes place when the subroutine REC is selected under the check mode during the execution of the main routine of FIG. 7 will now be described with particular reference to FIGS. 17(A) and 17(B). It is to be noted that during the execution of the subroutine REC, a check is carried out between the data registered in the area MA and the balance stored in the registers O and P in the area MC to determine the transaction of money.

Figure 17A:
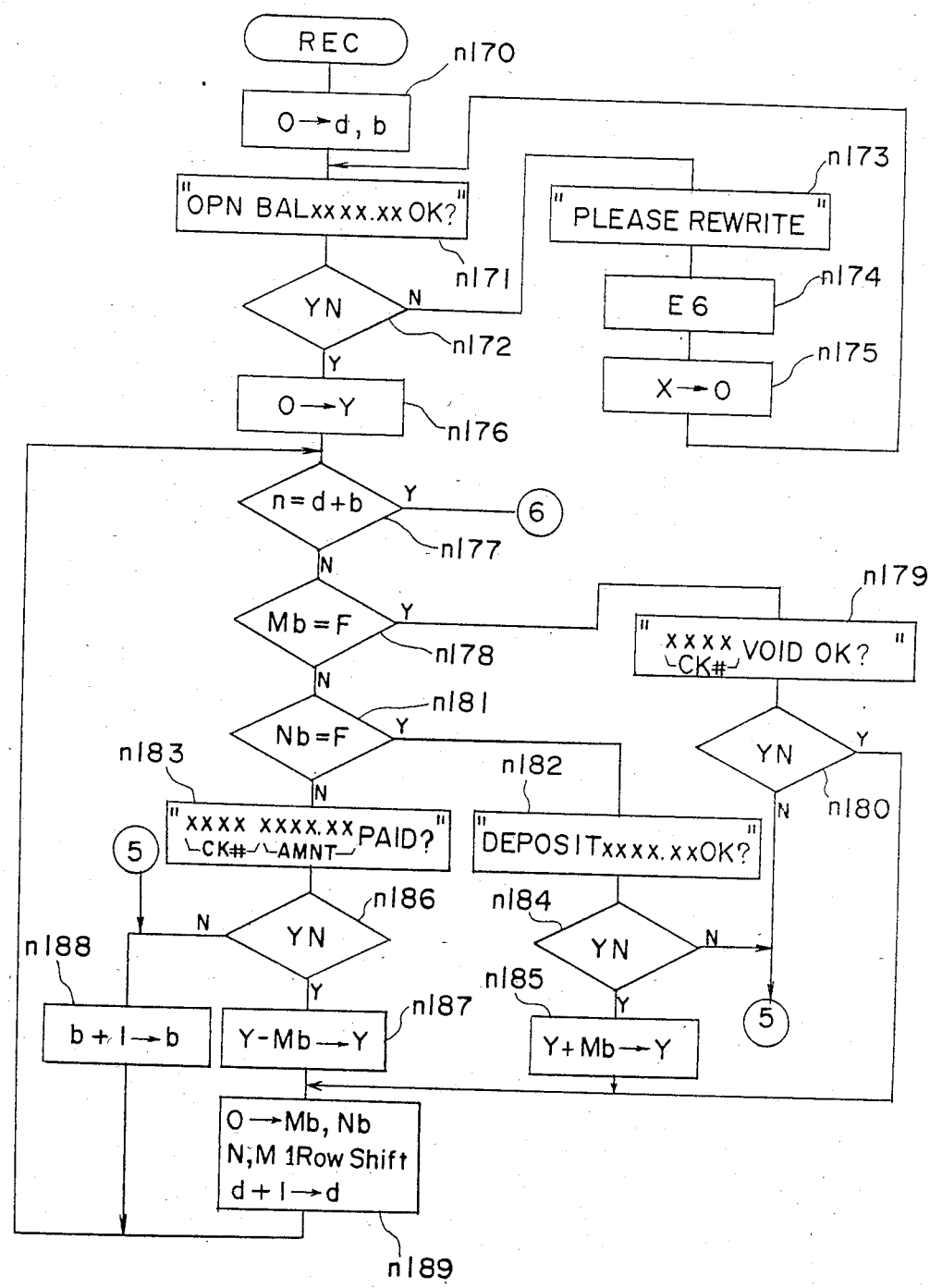

Referring now to FIG. 17(A), at the initial step n170, the counters d and b are reset. Then, at the step n171, the opening balance is displayed together with "OK?" asking for the user's reconfirmation. At this time, the user should refer to the opening balance described in the specification or statement forward from his or her banker to confirm that the opening balance displayed coincides with that described in the banker's specification. If the "NO" key is depressed at the step n172 when the opening balance displayed is found not coinciding with that in the banker's specification, the program flow proceeds to the step n173 with "PLEASE REWRITE" consequently displayed. After a new opening balance has been entered at the step n174, the content thereof is stored in the register O at the step n175. In the event that the "YES" key is depressed at the step n172, the content of the register O is temporarily transferred also to the register Y. The decision of the equation, n=d+b, to be done at the step n177 is for the purpose of checking whether or not the reconciliation has been completed, and since d+b=0 at the outset, the program step n177 is followed by the step n178 at which a decision is made as to whether the content of the register M specified by the counter b is F. If the content of the register M is found to be F signifying a void code, the program flow proceeds to the step n179 at which the display is effected to inform that the check number has been cancelled. When the user depresses the "YES" key at the step n180 having reconfirmed the content of the display at the step n179, the step n189 is carried out to clear the registers Mb and Nb specified by the counter b, to shift the specified registers M and N one row and to increment the counter d by one, followed by the return to the step n177.

On the other hand, if the content of the register Mb is found not to be the void code F at the step n178, the program flow proceeds to the step n181 at which a decision is made as to whether or not the content of the register Nb is the F code, that is, whether or not a deposit code is registered. If it is, the amount of deposited money then registered in the register Mb is displayed at the step n182 together with "OK?" asking for the user's reconfirmation. If the "YES" key is depressed at the step n184, the amount of deposited money is added to the content of the register Y and then stored in the register Y at the step n185. However, if the code registered in the register Nb is found not to be F at the step n181, the data stored in the registers Nb and Mb, that is, the number and amount of the check, are displayed at the step n183 together with "PAID?" asking the user if he or she has undoubtedly paid it. If the "YES" key is depressed at the step n186, the amount of the check is subtracted from the content of the register Y at the step n187, followed by the step n189 during which the registers Nb and Mb are reset and the registers M and N are shifted one row. Should the "NO" key be depressed at the step n186, the counter b is incremented by one and the program flow then returns to the step n177. In the manner described above, with the use of the register Y, the amount of the deposited money is added to the opening balance stored at the step n176 in the case of the registration of the deposit amount, or the amount of the check is subtracted therefrom in the case where the check has been drawn, thereby successively updating the content of the register Y. When it eventually becomes n=d+b at the step n177, that is, when the necessary calculation of all of the data registered has finished, the program flow proceeds to the step n190 shown in FIG. 17(B).

Referring to FIG. 17(B) and at the step n190, the content of the counter b is transferred to the counter 6 in readiness for the next drawing of a check and the next deposit of money. At the subsequent step n191, "ENTER CHARGE" is displayed to invite the user to enter the banker's charge, followed by the step n192 during which the charge entered in the register X is subtracted from the content of the register Y and also from the current balance stored in the register P. Thereafter, "ENTER INTEREST" is displayed at the step n194 to invite the user to enter the interest, and the interest entered in the register X at the step n195 is added to the content of the register Y and also to the current balance in the register P at the step n196. The amount of money finally calculated in the manner described above and stored in the register Y is displayed at the step n197 as a new balance. When and after the user has confirmed that the new balance displayed at the step n197 is correct, he or she has to depress the "YES" key at the step n198 to make the data stored in the register O at the step n199 as an opening balance for the next month. Should the "NO" key be depressed at the step n198 in view of the new balance being incorrectly displayed at the step n197, "PLEASE REWRITE" is displayed at the step n200. Then, at the step n201, a correct value is entered in the register X and, at the step n202, the content of the register X is stored in the register Y, the program flow then returning to the step n197. The program flow from the step n198 onto the step n200 is effected when the number of items to be registered has increased while the area MA is full, when the user has failed to enter information, and/or when an error has occurred on the part of the bank. Accordingly, when the program flow proceeds from the step n198 to the step n200, the current balance can be made to coincide with that described in the banker's specification by calculating the data in the case of the increased number of items to be registered while the memory is full or by calculating the information that has not yet been entered in the case of the failure to enter it. Should no coincidence take place even though the above described efforts have been done, it can be concluded that the error has occurred on the part of the bank.

As hereinbefore described, under the RECONCILE mode, the reconfirmation of the data registered and the check of the transaction of money against the opening balance can be performed easily and accurately.

In the foregoing embodiment, the timer has been described as used for effectuating an automatic registration in the event that neither the "YES" key nor the "NO" key has been depressed within a predetermined time in response to the inquiries as to whether or not the numerical values (check No. and amount) have been correctly entered. It is to be noted that the timer referred to above may be used concurrently for the auto power-off function, that is, for turning off the electric power supply after the registration.

As hereinbefore fully explained, the information processing device according to the present invention is of such a design that a response to an inquiry of whether or not the numerical value entered is correct can be done by depressing one of the "YES" or "NO" keys and is featured in the provision of means for taking for "YES" the failure to depress any one of these keys within a predetermined time. Accordingly, in the event that the response is "YES", the "YES" key need not be always depressed, and therefore the handling procedure can be simplified.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:

1. An electronic book-keeping device utilizeable in association with credit cards for the individual control of the cumulative amounts of the respective charges incurred by the use of the credit cards, which device comprises an input keyboard having a plurality of input keys for the entry of the amount of money payable for the purchase done by the use of each of the credit cards, a display unit disposed adjacent the input keys for displaying input data and results of calculations, a storage means for storing charges one for each of the credit cards, means for updating, each time the amount of the money is entered, the charge associated with one of the cards used, means for causing the display unit to display all of the symbols signifying the respective credit cards before one of the cards is selected, and means for selecting one of the cards when one of the input keys which is located adjacent one of the displayed symbols associated with said one of the cards has been depressed.

2. An electronic book-keeping device utilizeable in association with credit cards for the individual control of the cumulative amount of the respective charges incurred by the use of the credit cards, which device comprises an input keyboard having a plurality of input keys for the entry of the amount of money payable for the purchase done by the use of each of the cards, a storage means for storing charges one for each of the cards, means for updating, each time the amount of the money is entered, the charge associated with one of the cards used, means for displaying sequentially the charges associated with the respective cards either in the order from the highest charge to the smallest charge at the time of entry of the amount of the money or in the order from the smallest charge to the highest charge at the time of payment, and means for selecting a desired one of the cards while the charges are sequentially displayed.

* * * * *